United States Patent [19]

Kawakubo et al.

[11] Patent Number: 4,513,061
[45] Date of Patent: Apr. 23, 1985

[54] PRIMER COMPOSITION

[75] Inventors: Fumio Kawakubo; Toshifumi Hirose; Tadashi Minokami, all of Kobe; Miyako Hosaka, Miki; Katsuhiko Isayama, Kobe, all of Japan

[73] Assignee: Kanegafuchi Kagaku Kogyo Kabushiki Kaisha, Osaka, Japan

[21] Appl. No.: 422,291

[22] Filed: Sep. 23, 1982

Related U.S. Application Data

[63] Continuation of Ser. No. 228,953, Jan. 27, 1981, abandoned.

[30] Foreign Application Priority Data

Jan. 29, 1980 [JP] Japan .................................. 55-9511

[51] Int. Cl.³ .......................... C08F 11/04; C08C 9/18
[52] U.S. Cl. .................................... 428/429; 428/428; 428/426; 428/419; 428/446; 428/447; 428/448; 428/425.5
[58] Field of Search ............ 428/426, 428, 447, 425.5, 428/419, 416, 418, 450, 463

[56] References Cited

U.S. PATENT DOCUMENTS 3,214,436 10/1965 Boyle et al. ..................... 523/456 X
3,226,358 12/1965 Smith et al. ..................... 524/336 X
3,779,988 12/1973 Rembold et al. ............... 523/456 X
3,838,078 9/1974 Villa ................................ 428/426 X
4,076,764 2/1978 Bauer ............................. 523/456 X Primary Examiner—George F. Lesmes
Assistant Examiner—Nancy A. B. Swisher
Attorney, Agent, or Firm—Moonray Kojima

[57] ABSTRACT

A primer composition utilizable on glass surfaces, comprising a film forming component and an ultraviolet light absorbing component, and capable of shielding light having wavelengths of 380 nm or less. The primer composition protects curable compositions coated on top of the primer from adverse weather effects, such as on adhesion properties of the curable compositions onto a glass surface, the adhesion being maintained for substantially long periods of time.

16 Claims, 1 Drawing Figure

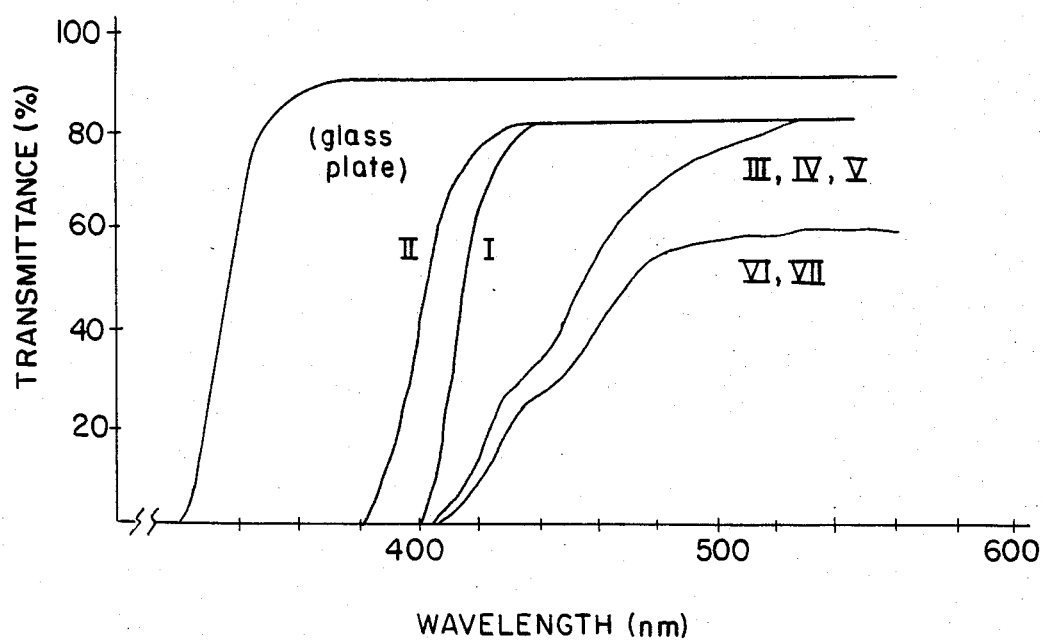

PRIMER COMPOSITION

This is a continuation of application Ser. No. 228,953, filed Jan. 27, 1981, now abandoned.

BACKGROUND OF THE INVENTION

This invention relates to a primer composition, and more particularly, to such primer composition utilizable on glass surfaces as an undercoating for a rubber or resin composition coating, such as for example, elastic sealant on a glass surface.

Coatings, such as those of rubber or resin composition, have been used in the prior art for various purposes. For example, in recent years, elastic sealants have shown a marked advance, and have gained widespread acceptance for use in automobiles, buildings, etc. Examples of sealants include those of the silicone type, the modified silicone type, the thiokol type and the urethane type. However, disadvantageously, these coatings are not entirely satisfactory in performance, especially when used in connection with glass surfaces. These coatings do not maintain adhesion to glass surfaces for any practical length of time. The weather and other factors, cause the sealant to loosen from the glass surface with passage of time, and finally losing adhesion entirely.

Thus, there is a marked deficiency in the prior art. There is a definite need for means to increase the length of time that coatings, such as elastic sealant, will adhere to surfaces, such as glass.

SUMMARY OF THE INVENTION

Accordingly, an object of the invention is to eliminate the aforementioned and other disadvantages and deficiencies of the prior art.

Another object is to provide means whereby coatings, such as elastic sealants, will maintain their adherence to glass surfaces for longer periods of time.

Another object is to provide a primer composition utilizable on a variety of surfaces, such as glass, as an undercoating for various coatings.

A further object is to improve the adhesion properties of coatings on materials without changing the contents of or acting on the coating composition itself, and to make such improvement in a simple, economical and efficient manner.

A further object is to improve the weather resistance of elastic sealants on glass surfaces, and especially the weather resistance to adhesion of such sealants on such surfaces.

The foregoing and other objects of the invention are attained by a primer composition comprising preferably 50 to 99 weight percent, more preferably, 60 to 90 weight percent, film forming substance, and preferably 0.5 to 35 weight percent, and more preferably 3 to 30 weight percent, ultraviolet light absorbing substance. The percentages are based on the solid components. The primer composition shields light having wavelengths of 380 nm or less, and is transparent to light of other wavelengths so that it can be used on glass surfaces. The film forming composition, the ultraviolet light absorbing composition, and optionally, pigments and/or dyes, may be mixed in a suitable solvent, to form a primer solution which can then be coated on a glass surface, for example. The solvent then is volatized and dried off to form a primer layer or film on the surface. The primer layer shields light having wavelengths of 380 nm or less, and is transparent to other wavelength light. On top of the primer layer, a curable resin composition or other compositions, may be coated. Advantageously, by using the primer composition of this invention, with the curable overcoating, the overcoating will adhere to the glass surface, and maintain such adherence for an unexpectedly long time without loosening the adhesion. Thus, advantageously, we have discovered a way of improving the long term adhesion properties of the coating composition without changing the components of or acting on the coating composition itself. Moreover, by use of our inventive primer composition, such improvement has been attained simply, economically, and efficiently.

A feature of this invention is a primer composition comprising a film forming composition or substance (the term composition and substance are used interchangeably in reference to the film forming substance and the ultraviolet light absorbing substance) and an ultraviolet light absorbing substance, and optionally, a pigment and/or dye; and which when used to form a primer layer shields light having a wavelength of 380 nm or less and is substantially transparent to other light wavelengths.

Another feature is a process for improving the weather resistant adhesion of a cured coating to glass surfaces, comprising the steps of coating a primer composition comprising a film forming substance and an ultraviolet light absorbing substance, onto a glass surface, to form a primer film which substantially shields light having wavelengths of 380 nm or less and is substantially transparent to other light wavelengths; and thereafter coating a curable composition on top of the primer film.

A further feature is a primer layer wherein the light absorption spectrum has a light transmittance factor of at least 5% in the region of 380 to 700 nm.

Another feature is the use of preferably 0.5 to 35 weight percent, and more preferably 3 to 30 weight percent of the ultraviolet light absorbing substance, and preferably from 50 to 99 weight percent, and more preferably 60 to 90 weight percent, of the film forming substance.

Another feature is the use of at least 0.1 weight percent of pigment and/or dye, in the primer composition.

A further feature is the use of benzophenone compound or a metal chelate compound as the ultraviolet light absorbing substance.

Another feature is the film forming substance being a member selected from the group consisting of silicon modified diallylphthalate prepolymer, silicon modified epoxy resin, silicon modified acrylic polymer and mixtures thereof; or having a major proportion of such member and a minor proportion of a member selected from the group consisting of polyisocyanate, silicon modified polyisocyanate, silane coupling agent, reaction products of silane coupling agents and mixtures thereof.

Another feature is the film forming substance being preferably of rubber and more preferably a silicon modified polyether.

Another feature is the curable composition coated on top of a primer film comprising film forming substance and ultraviolet light absorbing substance, said curable composition being preferably a sealant selected from the group consisting of modified silicone type sealant, urethane type sealant, and polysulfied type sealant.

BRIEF DESCRIPTION OF THE DRAWING

The sole FIGURE depicts a graph of the ultraviolet light visible spectra of the primer compositions obtained in Examples 1, 2 and 3.

DETAILED DESCRIPTION OF THE PREFERRED EMBODIMENTS

By using the primer composition of the invention, it is possible to satisfy two otherwise inconsistent factors, concurrently; namely, when the primer is used on a glass surface and a sealant is coated over the primer, it is possible to maintain high weather resistant adhesion of the sealant to glass for a long period of time, and to also retain transparency. The present invention is composed of solid components, which comprises a film forming substance, an ultraviolet light absorbing substance and, optionally, a pigment and/or dye, which solid components may be dissolved (and dispersed in the case of pigments) in a solvent. The term solid components as used herein refers to those components in the produced film after being coated on a substrate with the solvent being volatized and dried off.

FILM FORMING COMPONENT

The film forming substance or composition, used in the invention, may be any material which forms a film, when it is dissolved in a suitable solvent and is coated on a substrate and the solvent is volatized and dried off. Preferably, the film forming substance itself has a functional group and adheres to the substrate, such as glass. Specific examples of the film forming substances which may be used in the invention, include vinyl resins such as polystyrene, polyvinyl chloride and polymethyl methacrylate; condensation resins such as polycarbonates, polyamides, polyesters and polyethers, rubbers such as SBR, NBR, polychloroprene and epichlorohydrin rubber; and various oligomers. Examples of oligomers, may be those described at pages 273 to 275 of "Oligomer Handbook" (a Japanese language publication by Kagaku Kogyo Nippo-Sha). Preferred are such oligomers as diallyl phthalate, vinyl and polyether type oligomers having a hydrolyzable silyl group, and moisture curable oligomers of the silicone and isocyanate types. The above film forming compositions may be those which are commercially available; or those which are modification products of those commercial oligomers obtained by utilizing their functional groups. Among these oligomers, the most preferred is more or more of silicon modified diallyl phthalate prepolymer or silicon modified epoxy resin. The term "silicon modified" means that a backbone polymer, and as acrylic polymer, diallyl phthalate polymer or epoxy resin, is modified by its reaction with a compound having at least one hydrolyzable silyl group such as hydrosilane containing group, e.g. alkoxy group, aminoxy group, mercapto group, etc; and the thus modified polymer has become hydrolyzable. These oligomers may be used singly or in combination with each other in an amount preferably of 50 to 100 weight percent, and more preferably 50 to 95 weight percent, based on the weight of the film forming substance. These film forming substances are used in an amount sufficient to dissolve the ultraviolet light absorbing substance. The amount may be varied depending on the kinds of film forming substance, ultraviolet light absorbing substance and other additives to be employed. Generally, the amount of film forming substance is preferably 50 to 99 weight percent, and more preferably 60 to 90 weight percent, based on the solid components total weight.

The silicon modified diallyl phthalate can be prepared by reacting commercially available diallyl phthalate, e.g. DAISO DAP made by Osaka Soda Co, Ltd. with a compound having a silicon bonded hydrolyzable group such as trimethoxyhydrosilane in a solvent. The reaction may be effected in the presence of a platinum catalyst using 0.1 to 1.2 mol equivalent of the silane per one pendant double bond of the prepolymer. This modification method and modified polymer are disclosed, for example, in Japanese Patent Publication (unexamined Kokai) No. 37184/1979. Silicon modified diallyl phthalate is one of the film forming substances which may be used in the present invention, in view of its excellent ability to rapidly dry and its excellent compatibility with many different kinds of ultraviolet light absorbing compositions, and furthermore its tight adherence to a substrate, such as glass or metal.

The silicon modified epoxy resin may be prepared by a variety of methods. For example, it may be made by reacting a compound having at least two epoxy group (on average) per one molecule with a silicon compound having a group functional to the epoxy group, such as gamma-mercapto-propyltrimethoxysilane. Silicon modified epoxy resin and methods of preparing same are disclosed, for example, in Japanese Patent Application Ser. No. 100161/1980.

Silicon modified acrylic oligomers which may be used in the film forming composition and their preparation are disclosed, for example, in Japanese Patent Publication (Kokai) No. 139695/1978 and 36395/1978. These modified compounds are prepared by copolymerizing acrylic monomers, such as alkyl acrylate or alkyl methacrylate, containing other vinyl monomers copolymerizable therewith, with monomers having both acrylic or vinyl group and silicon bonded hydrolyzable group, or by reacting vinyl or acrylic polymer or copolymer having pendant allylic carbon-carbon double bond with a compound having silicon bonded hydrolyzable group, in the presence of a Pb catalyst.

In order to increase adhesion, various silane coupling agents themselves, or their reaction mixtures, and/or silicon modified polyisocyanate used together. It is sufficient to add such a silane coupling agent simply to the above film forming composition. Advantageously, the film forming composition may be used after adding the silane coupling agent and reacting it with the functional group of the silane coupling agent to modify the film forming composition. Examples of the reaction mixtures of the silane coupling agents are those of commercial primers. Some of these are described, for example, in Japanese Patent Application Nos. 114017/1979 and 138994/1979.

These reaction products can be prepared by reactions of non-silicon functional groups residing in two or more silane coupling agents, partial hydrolysis with silicon group or other functional groups, or of their mixtures. Preferred products are for example, the reaction products between gamma-gylcydoxypropyltrimethyoxy silane or gamma-methacryloxypropyl trimethoxy silane and N-beta-(aminolthyl)-gamma-aminopropyl trimethoxy silane.

Silicon modified polyisocyanates are disclosed, for example, in Japanese Patent Publication (Kokai) No. 17519/1977. The best suited to the instant composition is one which is prepared by modification reaction of polyisocyanates with silicon compound reactive thereto in such a manner that none of the complete isocyanate groups is left as it is after the reaction. Such modified polyisocyanates are disclosed, for example, in Japanese Patent Application Ser. No. 98872/1980.

The above silicon compound may be used in an amount preferably zero to 60 weight percent, and more preferably 5 to 50 weight percent, based on the weight of the film forming substance. In addition to these silicon compounds, the presence of rubber substances in the primer may further increase adhesion strength of the sealants coated on a primer layer. The rubber substances may be, for example, chloroprene, nitrile rubber, chloride rubber, etc. It was noted that among the rubbers, those modified with silicon showed remarkable improvement of tight adherence of sealants on glass surfaces, and especially on metal surfaces, such as aluminum. The rubber substance may be used in an amount preferably from zero to 30 weight percent, and more preferably 2 to 20 weight percent, based on the weight of the film forming substance.

ULTRAVIOLET LIGHT ABSORBING COMPONENT

Examples of the ultraviolet light absorbing substances utilizable in the inventive primer composition, include benzophenones, such as 2,4-dihydroxybenzophenone, 2-hydroxy-4-methoxybenzophenone, 2-hydroxy-4-bydroxybenzylbenzophenone, 2-hydroxy-4-octoxybenzophenone, and 2,2',4,4'-tetrahydroxybenzophenone; benzotriazoles such as 2-(2'-hydroxy-5-methylphenyl)benzotriazole, 2-(2'-hydroxy-3',5'-di-tert-butylphenyl)-5-chlorobenzotriazole and 2-(2'-hydroxy-3',5-di-tert-amylphenyl)benzotriazole; salicylates such as p-tert-butylphenyl salicylate; substituted nitriles such as ethyl-2-cyano-3,3-diphenyl acrylate and 2-ethylhexyl-2-cyano-3,3-diphenyl acrylate; and metal chelate compounds such as nickel di-n-butyl dithiocarbamate and nickel diamyl dithiocarbamate. These ultraviolet absorbing compositions may be used singly or in combination with each other.

Primer composition of this invention containing benzophenones or metal chelate compounds as the ultraviolet light absorbing composition are especially effective when a modified silicone type sealant, polysulfide type sealant, or a urethane type sealant, is used as the curable composition which is coated on top of a layer of the primer composition.

The amount of ultraviolet light absorbing substance may be adjusted according to the purpose and form of the primer composition. Preferably it is adjusted so that its concentration in the primer solution is not less than 0.5 weight percent. Thus, the amount of ultraviolet light absorbing substance is preferably within the range of 0.5 to 35 weight percent, and more preferably in the range of 3 to 30 weight percant, based on the total weight of the solid components.

LIGHT SHIELDING EFFECT OF THE PRIMER LAYER

By coating a primer solution containing such a film forming substance and an ultraviolet light absorbing substance on the surface, for example, of glass, once or more times, a film is formed which can shield light having a wavelength of not more than 380 nm, that is 380 nm or less. As a result of this film formation, light having a wavelength of 380 nm or less, very desirably, has a light transmittance (T%) through the glass of substantially zero at the sealant surface, the sealant being coated on top of the primer layer. But, it was discovered that even if the light transmittance is not more than about 10%, the primer layer proves effective in maintaining weather-resistance adhesion of the curable composition on the surface. On the other hand when the primer is used over glass, it must also retain transparency in order to be of practical use. Advantageously, the inventive primer composition when formed as a primer layer has a light transmittance to light of wavelengths over 380 nm. It was discovered that transparency can be retained by the primer layer when it has an absorption wavelength band with light transmittance of preferably at least 5%, and more preferably 30%, in a wavelength region of between 380 nm and 700 nm. Thus, the inventive primer composition readily meets these requirements. The light transmittance can be easily determined experimentally, if the components (such as dyes and pigments) of the primer composition and its mode of use are specified. Thus, by suitable use of pigments and/or dyes, and other additives, the inventive primer layer can still be sufficiently transparent to be of practical value. It should be understood, however, that the primer composition of this invention is not limited to use on glass surfaces requiring transparency. The primer composition can also be used on other surfaces and serve its function as a primer and serve to maintain the adhesion of other compositions coated on top of such primer layer.

OTHER COMPONENTS UTILIZABLE WITH OR IN THE PRIMER COMPOSITION

By including various pigments and dyes in the composition of this invention, as desired, it is possible to adjust color hues and increase the weather-resistant adhesion of a cured overcoating. Examples of pigments which may be used in the primer composition include inorganic pigments, such as chromic acid salts, ferrocyanides, sulfides, sulfuric acid salts, oxides (e.g. titanium white, red iron oxide), double oxides (e.g. titanium yellow), hydroxides, carbonates, silicic acids, carbon (e.g. carbon black), and metal powders; and organic pigments, such as nitroso compounds, nitro compounds, azo compounds, condensed azo compounds, quinacridone compounds, isoinsolinone compounds, anthraquinone compounds and phthalocyanine compounds. Oil soluble dyes may be used. These pigments and dyes may be used singly or in combination. It is possible to shield a desired part of the light bandwidth by suitable selection of dyes and pigments. However, it is essential to use the aforementioned ultraviolet light absorbing composition or substance in order to screen out the light having wavelengths of 380 nm or less, and thus produce the desired effect of lengthening the time that the overcoating will maintain its adherence to the substrate surface.

Suitable amounts of the pigment and/or dye to be used is at least 0.1 weight percent, based on the primer solution, in order to save on the amount of manual labor used for the coating. Pigment and/or content of the ultraviolet light absorbing substance of the solid components is preferably 0.5 to 35% by weight, more preferably 3 to 30 weight percent. Since the pigment or dye has its own light wavelength absorbing band, in determining the amount to be used, care must be taken so that the primer film will retain transparency if used on glass or other transparent surface. In such cases it is preferred to use pigments and/or dyes having specific absorbing band of wavelengths between 400 to 500 nm.

A suitable organic solvent is desirable as another primer component. The organic solvent may be any organic solvent which can dissolve the film forming composition, the ultraviolet light absorbing composition, and the dye, if used, and which can disperse the pigment, if used, and furthermore is inert to each of these components. Specific examples of solvents which may be used in this invention include aliphatic hydrocarbons, such as n-hexane and cyclohexane; aromatic hydrocarbons, such as benzene, toluene, xylene and chlorobenzene; ketones, such as acetone and methyl ethyl ketone, esters, such as ethyl acetate and butyl acetate; and alcohols, such as methanol and ethanol. These solvents may be used singly or in combination. If desired, the organic solvent may be subjected to dehydrating treatment.

The organic solvent may be used in an amount of preferably 30 to 95 parts by weight, and more preferably 55 to 95 parts by weight, per 5 to 70 parts by weight of the solid components (that is the non-volatizable components). If its amount is less than 30 parts by weight, the viscosity of the primer solution becomes excessively high, and both the operability and storage stability of the primer solution is degraded. If it is used in an amount of more than 95 parts by weight, the film forming composition and the ultraviolate light absorbing composition cannot be incorporated in desired amounts into the primer solution, and the objects of this invention cannot be achieved.

PREPARATION OF PRIMER SOLUTION

There is no particular restriction on the method of preparing the primer solution. The individual components may be added all at once to the solvent, or portionwise to the solvent to cause their dissolution in the solvent, or where pigments are used their dispersal in the solvent. In another method, an organic solvent solution of the film forming component may be first prepared, and then, the remaining components may be dissolved or dispersed in the mixture solution. In still another method, pigment may first be kneaded and dispersed in the film forming composition by means of a three paint roll mill, a ball mill, a high speed rotary mixer, etc, and then the resultant may be dispersed in the solvent. A processed pigment may be dispersed effectively in the solvent by a high speed rotary mixer, etc. In order to increase the storage stability of the primer solution, a dehydrating agent such as molecular sieves may be added.

CURABLE COMPOSITION AS COATING ON TWO OF PRIMER LAYER

Various kinds and types of overcoatings may be used on top of the primer layer placed on a substrate surface. The primer has been found to be especially effective when used in combination with a sealant on glass surfaces, such as for example, a modified silicone type sealant, a polyuretane type sealant, or a polysulfide type sealant. These sealants are commercially available and are used for example in JIS (Japanese Industrial Standard) A5758. Advantageously, by use of the inventive primer composition, we have substantially affected the long range properties of the coating composition, without having to change the components of or acting on the coating composition itself. Mere use of this primer composition as an undercoating layer produces this outstanding and unexpected effect. Thus, the solution to the problem, long existent in the prior art, as provided by this invention is simple, efficient and economical. The savings in the products using sealants is substantial, not only in terms of longer life, but also in terms of conservation of material and labor.

The modified silicone type sealant, just discussed, is used in the JIS tests. It is a curable polymer, such as the one obtained by introducing a hydrolyzable silyl group into an organic polymer, such as a polyether. As for the polymer so modified by silicon and their preparation, reference may be made, for example, to Japanese Patent Publication Ser. Nos. 36317/1970; 73998/1977 (Kokai) and 131022/1980 (Kokai).

USE OF PRIMER LAYER AS UNDERCOATING FOR CURABLE COMPOSITION OVERCOAT

The above primer solution (i.e. containing the film forming component, the ultraviolet light absorbing component, and optionally, the pigment and/or dye, in a solvent) may be utilized as a coating on a desired surface, such as glass or metal, by coating same using a brush, spraying or other appropriate means of application, onto the surface. The solvent may then be volatized, such as by heating in air, and until the solvent is dried off, and leaving the other components (referred to as solid components above) as a thin layer or film of homogeneous mixture of the solid components. Then, another coating may be placed on top of the primer layer. For example, a curable composition, for example, an elastic sealant, such as a modified silicone type, a polyurethane type or a polysulfide type, may be then coated on top of the thin layer of primer and then cured to form a sealant on the glass surface. Advantageously, the primer layer screens out light having a wavelength of 380 nm or less, and is substantially transparent to light of other wavelengths (unless there are pigments and/or dyes used which can selectively block other wavelengths, but in which case, such pigments and/or dyes will be used in such amounts and kind as to permit a transmittance rate of preferably at least 5% and more preferably at least 30% in the 380 to 700 nm band of wavelengths). Unexpectedly, the curable composition was found to maintain its adherence to the glass surface for a substantially longer period of time, than would be the case where the curable composition was used without the inventive primer undercoating. The length of time of adhesion was found to be unexpectedly long in contrast to the prior art, as can be seen from the below Examples.

The use of the primer composition prepared as above, when used together with a curable composition overcoating on top of the primer layer, is very effective in improving the weather resistant adhesion of the curable composition layer onto glass.

The following examples further illustrate the invention. These examples, however, are not to be considered or construed to be limiting of the invention. Unless otherwise specified, the terms "part" and "percent" are in terms of weight.

REFERENTIAL EXAMPLE 1

350 g of diallyl phthalate prepolymer (Daiso DAP L, a trade mark of Osaka Soda Co, Ltd), were dissolved in 500 g of toluene, and 0.15 ml of isopropanol solution containing 10% by weight of chloroplatinic acid. Then, 150 g of trimethoxysilane was added and reacted at 90° C. for 4 hours. Infrared spectral analysis showed that the absorption attributable to the carbon-carbon double bonds present in the starting material disappeared in the resulting resin, and its iodine value was less than 4. Thus, it was presumed to have a structure in which trimethoxysilane was added to more than 95% of the double bonds present in the starting material. Silicon modified diallylphthalate prepolymer was thus prepared. This prepolymer was used in the later examples as the film forming composition.

REFERENTIAL EXAMPLE 2

A solution prepared by dissolving 30 g of styrene, 16 g of allyl methacrylate, 20 g of methyl methacrylate, 19 g of n-butyl methacrylate, 14 g of butyl acrylate, 1 g of acrylic acid and 2 g of n-dodecyl mercaptan, was added dropwise to 300 g of toluene heated at 90° C. and reacted for 10 hours to obtain a vinyl copolymer containing an allylic unsaturated group and having a molecular weight of 8,000. To the resulting vinyl copolymer solution (100 g) was added a solution of 3.5 g of methyldimethoxysilane and 0.01 ml of isopropanol chloroplatinic acid solution. The resulting mixture was reacted at 90° C. for 6 hours under sealing. By the same infrared spectral analysis as in Referential Example 1, the resulting polymer was presumed to have a structure in which the dimethoxysilane was added to more than 95% of the double bonds present in the starting material. A silicon-modified acrylic oligomer was thus obtained for use in the below Examples, as the film forming substance.

REFERENTIAL EXAMPLE 3

To a solution of 183 g toluene with 122 g of epicoat 834x-90, 1 g of 2,4,6-tris(dimethylaminomethyl)phenol and 86 g (A-189 Japan Unicar Co, Ltd) of $HS(OCH_2)_3Si(OCH_3)_3$ were added. Then, the resulting composition was allowed to react at 110° C. for 2 hours under a nitrogen atmosphere to prepare an epoxy resin modified with silicon. This prepared resin was used in the below examples as the film forming substance.

REFERENTIAL EXAMPLE 4

100 g of $H_2NCH_2CH_2NH(CH_2)_3Si(OCH_3)_3$ (A-1120) and 113 g of $CH_2=CH(CH_3)CO_2(CH_2)_3Si(OCH_3)_3$ (A-174) were reacted at 130° C. for 5 hours under a nitrogen atmosphere. The reaction product was a silane coupling agent reaction product, which was used in the below example as the filmforming substance.

REFERENTIAL EXAMPLE 5

A solution was prepared by dissolving 100 g of DISMODULE (manufactured by Sumitomo-Bayer Uretan, a polyisocyanate) into 70 g of ethylacetate, 50 g of A-189 and 0.5 g of tin-octylate were added thereto. Then, the resulting composition was reacted at room temperature for 2 hours. A silicon modified polyisocyanate was produced for use in the Examples hereinbelow, as the film forming substance.

EXAMPLES 1, 2, AND 3

A solution was prepared by dissolving 22.5 parts of the silicon modified diallylphthalate prepolymer obtained in referential example 1, 7.5 parts of the reaction product of silane coupling agent obtained in referential example 4 and 3 parts of a silicon modified polyether (MSP-20A, made by Kanegafuchi Kagaku Kogyo Kabushiki Kaisha) into a mixture containing 60 parts of toluene and 10 parts of methanol. Each of the ultraviolet absorbers and each of the pigments or dyes shown in below Table 1 were added in the amounts (by weight) indicated in Table 1, to 100 parts by weight of the above solution.

The pigment was dispersed by using a high speed stirrer (Ace Homogenizer Model AH7, a product of Nippon Seiki Seisakusho) running at 15,000 rpm for a period of 5 minutes. The resulting primer solutions were each coated on one surface of a glass sheet having a size of 5 cm×5 cm×0.5 cm, by using absorbent cotton as the applicator, and then the coatings were air dried for about 2 hours. Then, the ultraviolet light visible spectrums of the resulting primer films were measured. The results are shown in the sole figure of the drawing. It is seen that every primer had a transmittance (T%) of light of a wavelength of 380 nm or below of 0, and substantially shielded light having a wavelength of 380 nm or less. By using a yellow pigment or dye together, light having a wavelength of less than 500 nm was also shielded. These primers had an absorption wavelength band with a transmittance of more than at least 5% in the region of 380 nm to 700 nm, and thus could be considered transparent.

TABLE 1

| (Composition of Ultraviolet Shielding Primer) | | | | | | | | |
|---|---|---|---|---|---|---|---|---|
| Components | Primer No. | I | II | III | IV | V | VI | VII |
| Ultraviolet absorber | Cyosorb *1 UV 24 | 5 | — | — | 5 | — | — | — |
| | Tinuvin-327 *2 | — | 3 | — | — | 3 | 3 | 3 |
| | NBC *3 | — | — | 6 | — | — | 6 | 6 |
| Pigment or dye | Fuji Yellow #3 *4 | — | — | — | 1 | — | — | — |
| | MICROLITH yellow 3RT *5 | — | — | — | — | 3 | 3 | 3 |
| dye | Sudan Black *6 | — | — | — | — | — | — | 0.1 |

Notes:
*1 = Benzophenone-type made by American Cyanamide Company.
*2 = Benzotriazole-type made by Ciba-Geigy.
*3 = Nickel (II) dibutyldithiocarbamate.
*4 = Azoic pigment made by Fuji Shikiso
*5 = Isoidolinone-type processed pigment made by Ciba-Geigy.
*6 = Black dye made by Chuo Gosei Kagaku Co, Ltd.

Using the primer compositions nos. III, V and VII, shown in Table 1 and commercially available primer APZ-730, the weather-resistant adhesion of sealants shown in Table 2 was evaluated. The results are shown in Table 3 together with those of a comparative example. The evaluation was made in accordance with JIS-A5758 by subjecting an H-shaped sample to accelerated exposure by a sunshine long-life weather-ometer (Model WEL-3HC, a product of Suga Testing Machine Co, Ltd), and then subjecting the sample to a tensile test by an autograph (Model IS-5000, a product of Shimazu Seisakusho). The primer compositions were coated on glass surface as above and then the curable compositions were coated on top of the primers to make the samples.

TABLE 2

| (Formulation of Composition for Evaluating Weather Resistant Adhesion *1) | | |
|---|---|---|
| | Component | Formulation (parts by weight) |
| base | MSP20A *2 | 100 |
| | EP-S *3 | 45 |
| | Calcium carbonate (CCR) | 110 |
| | Titanium Oxide | 10 |
| | DISPARLON 305 *4 | 6 |
| | Carbon black | 0.5 |
| | Tinuvin-327 | 1.0 |
| | NOCRAC NS-6 *5 | 1.0 |
| Curing | Tin octylate | 2 |

TABLE 2-continued (Formulation of Composition for Evaluating Weather Resistant Adhesion *1)

| Component | | Formulation (parts by weight) |
|---|---|---|
| agent | Laurylamine | 1 |
| | Titanium oxide | 6 |
| | Dioctyl phthalate (DOP) | 18 |

Notes:
*1 = The base was prepared by kneading the ingredients with a three point roll mill, and the curing agent was prepared by kneading the ingredients with a high speed stirrer (homogenizer).
*2 = Modified silicone polymer, a product of Kanegafuchi Kagaku Kogyo Kabushiki Kaisha.
*3 = Epoxidized hydrophthalic ester, a product of Shinippon Rika.
*4 = Hydrogenated castor oil, a product of Xasumoto Chemical Co, Ltd.
*5 = Phenolic antioxidant, a product of Ouchi Shinko.

EXAMPLE 4

A solution was prepared by dissolving 22.5 parts of the silicon-modified acrylic oligomer prepared in referential example 2, 7.5 parts of the reaction product of silane coupling agents in referential example 4 and 3 parts silicon modified polyether into a mixture containing 30 parts of toluene, 30 parts of ethylacetate and 10 parts of methanol.

TABLE 3

(Sunshine Data)

| | Primer | Sunshine exposure time (hr) | 150% modulus kg/cm$^2$ | strength at breakage kg/cm$^2$ | elongation % | *2 State of fracture |
|---|---|---|---|---|---|---|
| Comparative Example 1 | *1 APZ-730 | 0 | 2.0 | 6.5 | 690 | Cf |
| | | 180 | 2.3 | 4.1 | 440 | Af |
| | | 360 | 2.4 | 2.5 | 160 | Af |
| | | 540 | — | 1.1 | 50 | Af |
| Example 1 | III | 0 | 2.2 | 1.2 | 710 | Cf |
| | | 180 | 2.4 | 6.9 | 700 | Cf |
| | | 360 | 2.5 | 7.1 | 720 | Cf |
| | | 540 | 2.7 | 7.0 | 690 | Cf |
| Example 2 | V | 0 | 2.3 | 6.9 | 680 | Cf |
| | | 180 | 2.3 | 7.2 | 690 | Cf |
| | | 360 | 2.4 | 7.3 | 710 | Cf |
| | | 540 | 2.6 | 7.1 | 700 | Cf |
| Example 3 | VII | 0 | 2.3 | 6.2 | 610 | Cf |
| | | 180 | 2.4 | 6.7 | 590 | Cf |
| | | 360 | 2.6 | 6.5 | 670 | Cf |
| | | 540 | 2.8 | 6.8 | 670 | Cf |

Notes:
*1 = Primer (silicone type) made by Nippon Unicar Co. Ltd (Comparative Example 1)
*2 = Cf: sealant fracture; Af: interfacial delamination.

To 100 parts of the resulting solution, 6 parts of UVI-NUL D50 (Benzophenone type ultraviolet absorber, made by GAF), 3 parts of MICROLITH yellow 3GT (yellow pigment made by Ciba-Geigy) and 0.1 parts of Varifast Black (black dye made by Orient Chemicals Compan) were added to form a primer solution VIII.

Using the above primer solution, the weather resistant adhesion on glass of a commercially available modified silicone type sealant (Hamatight Super II made by Yokohama Rubber Co, Ltd) was evaluated in the same way as in Examples 1, 2 and 3. The results are shown in Table 4.

TABLE 4

(Sunshine Data)

| | Primer | Sunshine exposure time (hrs) | 150% modulus kg/cm$^2$ | Strength at breakage kg/cm$^2$ | elongation % | *2 state of fracture |
|---|---|---|---|---|---|---|
| Example 4 | VIII | 0 | 1.0 | 3.7 | 740 | Cf |
| | | 180 | 1.0 | 4.7 | 850 | Cf |
| | | 360 | 1.0 | 4.0 | 800 | Cf |
| | | 540 | 0.9 | 3.9 | 780 | Cf |
| Comp. example 2 | APZ-730 | 0 | 0.9 | 4.5 | 880 | Cf |
| | | 180 | 0.8 | 2.1 | 560 | Af |
| | | 360 | 0.6 | 1.0 | 340 | Af |
| | | 540 | — | 0.5 | 60 | Af |

Note:
See Table 3 for definitions.

EXAMPLE 5

A solution was prepared by mixing 22.5 parts of silicon-modified epoxy resin prepared in referential example 3, 7.5 parts of the reaction product prepared in referential example 4, 30 parts of toluene, 30 parts of ethyl acetate, 10 parts of methanol. To 100 parts of the resulting solution, 6 parts of Ni(II)-diamyldithiocarbamate, 3 parts MICROLITH yellow 2 GT and 0.1 part of oil black were added to form a primer solution IX. Using the primer solution IX, the weather resistant adherence to glass of modified silicone sealant (Kanebo P-8000 made by Kanebo NSC) was evaluated as in Example 1, 2 and 3. The results are shown in Table 5.

TABLE 5

(Sunshine Data)

| | Primer | Sunshine exposure time hrs | 150% modulus kg/cm$^2$ | strength at breakage kg/cm$^2$ | elongation % | *2 state of fracture |
|---|---|---|---|---|---|---|
| Example 5 | IX | 0 | 2.8 | 6.4 | 580 | Cf |
| | | 180 | 3.4 | 6.0 | 520 | Cf |
| | | 360 | 3.7 | 6.3 | 540 | Cf |
| | | 540 | 3.7 | 6.2 | 510 | Cf |

Note:
For definitions see Table 3.

EXAMPLE 6

A solution was prepared by mixing 22.5 parts of the silicon modified diallyl phthalate prepolymer of referential example 1, 7.5 parts of the silicon modified polyisocyanate of referential example 5, 3 parts of silicon modified polyether, 30 parts of toluene, 30 parts of ethyl acetate and 10 parts of methanol. To 100 parts of the resulting mixture, 3 parts of NBC, 3 parts of TINUVIN 328 (benzotriazole type ultraviolet light absorbing substance made by Ciba-Geigy), 3 parts of MICROLITH yellow 3Gt and 0.1 part of Sudan Black 141 were added to form a primer solution No. X.

Using the primer solution x, weather resistant adherence of a commercially available modified silicone type sealant (Penguin Seal 2500 made by Sun Star Chemical Co, Ltd) to glass was evaluated as in Examples 1, 2 and 3. The results are shown in Table 6.

TABLE 6

| | | (Sunshine Data) | | | |
|---|---|---|---|---|---|
| | Primer | Sunshine Exposure time (hrs) | 150% modulus kg/cm$^2$ | Strength at breakage kg/cm$^2$ | elongation % | *2 State of fracture |
| Example 6 | X | 0 | 2.7 | 7.5 | 770 | Cf |
| | | 180 | 2.9 | 7.4 | 760 | Cf |
| | | 360 | 3.4 | 7.6 | 780 | Cf |
| | | 540 | 3.7 | 7.5 | 750 | Cf |

Note:
For definitions

As can be seen from the foregoing tables, the ultraviolet light absorbing primers of this invention unexpectedly lengthened the maintenance of adherence of the sealant to the glass surface.

The foregoing is illustrative of the principles of the invention. Numerous other modifications and extensions thereof would be apparent to the worker skilled in the art. All such modifications and extensions are to be considered to be within the spirit and scope of the invention.

What is claimed is:

1. In a coated glass surface consisting essentially of a primer coating directly on top of a glass surface and a sealant overcoating directly on top of said primer coating, wherein said sealant is a curable composition selected from the group consisting of modified silicon, urethane and polysulfide; the improvement consisting of said primer coating comprising 50 to 90 weight percent film forming substance, 0.5 to 35 weight percent ultraviolet light absorbing substance, and 0 to at least 0.1 weight percent pigment and/or dye, and said primer coating being formable into a film which substantially shields light have a wavelength of 380 nm or less and which is substantially transparent at other wavelengths with at least a transmission factor of at least 5% at the other wavelengths; whereby said primer coating does not substantially effect chemically said sealant coating, and whereby the period of adherence of said sealant onto said glass surface without deterioration is substantially lengthened.

2. The coating of claim 1, wherein the said film has a light transmittance of at least 5% in the region of 380 to 700 nm wavelength.

3. The coating of claim 1, wherein said composition further comprises at least 0.1% by weight of a pigment and/or dye.

4. The coating of claim 1, wherein said ultraviolet light absorbing component is a benzophenone compound or a metal chelate compound.

5. The coating of claim 1, wherein said film forming component is a member selected from the group consisting of silicon modified diallyl phthalate prepolymer, silicon modified epoxy resin, silicon modified acrylic polymer and mixtures thereof.

6. The coating of claim 1, wherein said film forming component contains a major proportion of the member recited in claim 6, and a minor proportion of a member selected from the group consisting of polyisocyanate, silicon modified polyisocyanate, silane coupling agent, reaction products of silane coupling agents and mixtures thereof.

7. The coating of claim 6, wherein said major proportion member is a silicon modified diallyl phthalate prepolymer and said minor proportion member is a reaction product of silane coupling agents.

8. The composition of claim 6, wherein said film forming component comprises a rubber substance.

9. The composition of claim 8, wherein said rubber substance is a silicon modified polyether.

10. The coating of claim 1, wherein said film forming substance is used in an amount of from 60 to 90 weight percent, and said ultraviolet light absorbing substance is used in an amount of from 3 to 30 weight percent.

11. The coating of claim 1, wherein said pigment and/or dye is used in an amount of at least 0.1 weight percent, and wherein said film has a light transmission factor of 5% or more at the wavelength band of 380 nm to 700 nm.

12. The coating of claim 11, wherein said transmission factor is at least 30%.

13. In a two part coated glass surface, comprising a primer coating directly on top of said glass surface and a sealant overcoating directly on top of said primer coating, wherein said sealant overcoating is a curable composition selected from the group consisting of modified silicone, urethane, and polysulfide; the improvement consisting of said primer coating comprising 30 to 95 parts by weight of an organic solvent; 5 to 70 parts by weight of the following components: 50 to 99 weight percent of a film forming component, 0.5 to 35 weight percent of an ultraviolet light absorbing component, and 0 to at least 0.1 weight percent of a pigment and/or dye, wherein said organic solvent is volatizable upon application on said glass surface thereby to leave a film of said film forming component, said ultraviolet light absorbing component and said pigment and/or dye in homogeneous mixture, thereby to block light having a wavelength of 380 nm or less, thereby to lengthen the maintenance of adherence of said curable sealant overcoating to said glass surface without deterioration, for a substantially longer period of time.

14. The coating of claim 13, wherein said solvent is used in an amount of from 55 to 85 parts by weight.

15. The coating of claim 13, wherein said film forming component is in an amount of from 60 to 90 weight percent; and said ultraviolet light absorbing component is in an amount of from 3 to 30 weight percent.

16. The coating of claim 1, wherein said ultraviolet light absorbing component comprises 3 to 35 weight percent.

* * * * *